United States Patent
Kauhanen

(10) Patent No.: US 9,398,232 B2
(45) Date of Patent: Jul. 19, 2016

(54) SPECIAL EFFECT VIDEO CAMERA

(75) Inventor: Jouni Kauhanen, Lempaala (FI)

(73) Assignee: Nokia Corporation, Espoo (FI)

( * ) Notice: Subject to any disclaimer, the term of this patent is extended or adjusted under 35 U.S.C. 154(b) by 13 days.

(21) Appl. No.: 14/387,917

(22) PCT Filed: Mar. 26, 2012

(86) PCT No.: PCT/FI2012/050301
§ 371 (c)(1),
(2), (4) Date: Nov. 7, 2014

(87) PCT Pub. No.: WO2013/144415
PCT Pub. Date: Oct. 3, 2013

(65) Prior Publication Data
US 2015/0071617 A1    Mar. 12, 2015

(51) Int. Cl.
*H04N 5/62* (2006.01)
*H04N 5/262* (2006.01)
*H04N 5/232* (2006.01)
*G02B 27/64* (2006.01)
*G11B 27/031* (2006.01)

(52) U.S. Cl.
CPC ............ *H04N 5/2621* (2013.01); *G02B 27/646* (2013.01); *G11B 27/031* (2013.01); *H04N 5/2328* (2013.01); *H04N 5/23254* (2013.01); *H04N 5/23264* (2013.01); *H04N 5/23287* (2013.01); *H04N 5/262* (2013.01)

(58) Field of Classification Search
CPC ............ G02B 27/646; H04N 5/23254; H04N 5/23264; H04N 5/23267
See application file for complete search history.

(56) References Cited

U.S. PATENT DOCUMENTS

| | | | |
|---|---|---|---|
| 7,978,222 B2 * | 7/2011 | Schneider | G03B 17/00 348/208.1 |
| 2004/0021953 A1 | 2/2004 | Betensky et al. | |
| 2006/0033817 A1 | 2/2006 | Ishikawa et al. | |
| 2006/0125926 A1 | 6/2006 | Nishino | |
| 2007/0050139 A1 | 3/2007 | Sidman | |
| 2007/0156364 A1 | 7/2007 | Rothkopf | |
| 2010/0165123 A1 | 7/2010 | Wei et al. | |
| 2011/0111800 A1 | 5/2011 | Harper | |

OTHER PUBLICATIONS

Mohan, Ankit, et al., "Image Destabilization: Programmable Defocus using Lens and Sensor Motion", IEEE Conference on Computational Photography (ICCP), Apr. 16-17, 2009, 8 pgs.

* cited by examiner

*Primary Examiner* — Huy T Nguyen
(74) *Attorney, Agent, or Firm* — Harrington & Smith

(57) ABSTRACT

A method and apparatus for producing special effects with a video camera with a process including: receiving successive video image frames from an image sensor; storing motion effect data defining a special effect; and producing instructions to an image stabilizer such that the following one or more video image frames will be moved in at least one of X- and Y-directions.

31 Claims, 6 Drawing Sheets

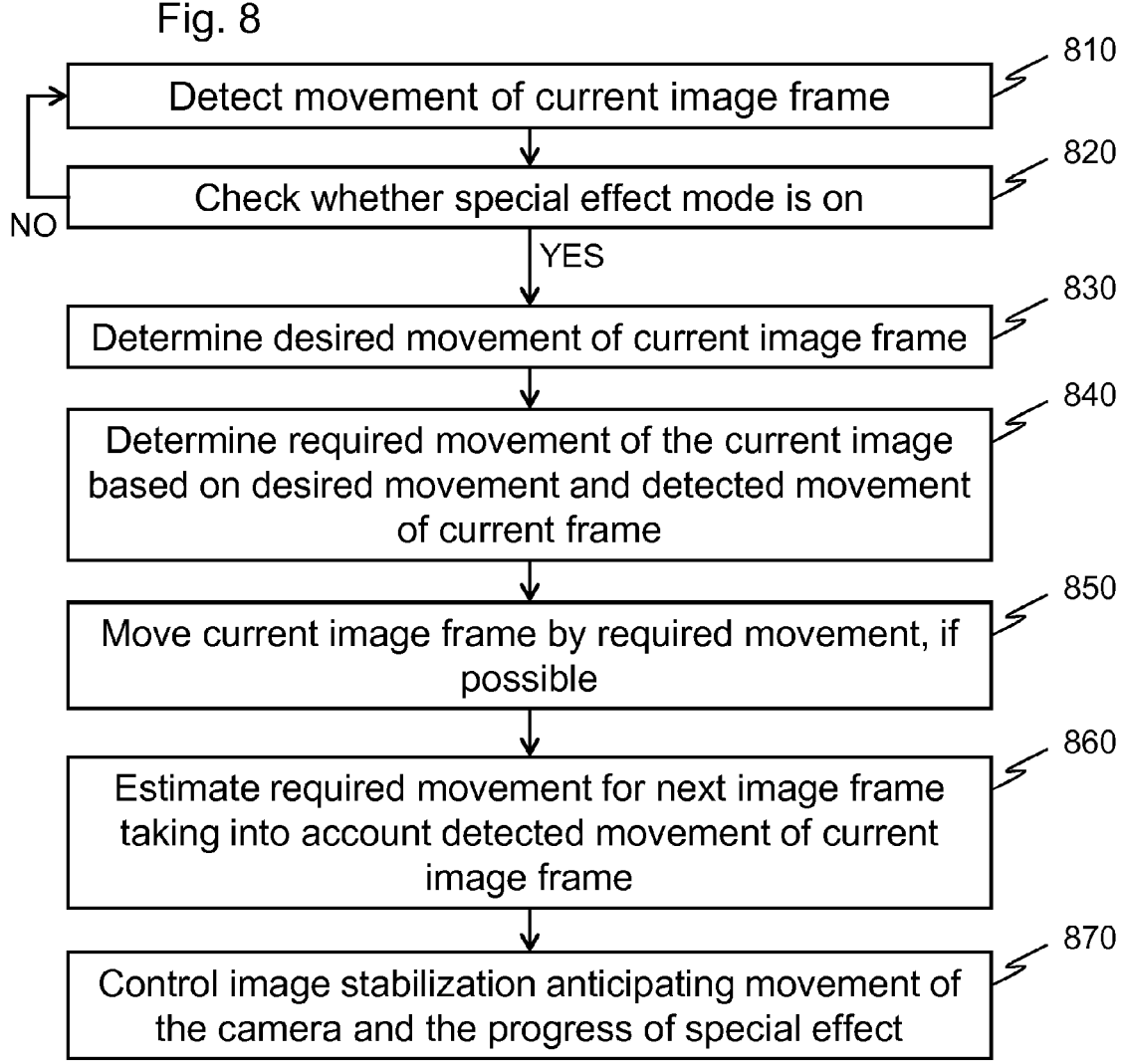

SPECIAL EFFECT VIDEO CAMERA

TECHNICAL FIELD

The present application generally relates to a special effect video camera.

BACKGROUND

Video cameras have become increasingly common and the development of digital technology has enabled increasingly many people to produce videos with effects similar to those used in movie industry. Indeed, many video tricks are based on the concept that in the video image, human brain is easily tricked by tilting or rocking a video camera. A person can climb an upright wall in a video footage that was actually captured in horizontal or nearly horizontal position, or suitably shaking image gives credibility to an earthquake or train collision scene, for instance.

The special effects were earlier typically created by suitably manipulating a film camera while shooting a scene. Later, digital technology has enabled easily producing the special effects with suitable software. With digital editing, the special effects can accurately be timed and implemented just as desired. Moreover, digital video editing removes the need for complex and expensive mechanical systems that would otherwise be needed if special effects were implemented with moving of the video camera in a controlled fashion.

SUMMARY

Various aspects of examples of the invention are set out in the claims.

According to a first example aspect of the invention, there is provided an apparatus comprising:

an input configured to receive successive video image frames from an image sensor;

a memory configured to store motion effect data defining a special effect; and a special effect controller configured to produce instructions to an image stabilizer such that the following one or more video image frames will be moved in at least one of X- and Y-directions.

The apparatus may further comprise a camera unit. The camera unit may comprise the image sensor.

According to a second example aspect of the invention, there is provided a method, comprising:

receiving successive video image frames from an image sensor;

storing motion effect data defining a special effect; and producing instructions to an image stabilizer such that the following one or more video image frames will be moved in at least one of X- and Y-directions.

According to a third example aspect of the invention, there is provided a computer program, comprising:

code for performing a method of the second example aspect of the invention, when the computer program is run on a processor.

According to a fourth example aspect of the invention, there is provided a memory medium comprising the computer program of the third example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 8 shows a flow chart of a process according to an example embodiment of the invention.

DETAILED DESCRIPTION OF THE DRAWINGS

An example embodiment of the present invention and its potential advantages are understood by referring to FIGS. 1 through 8 of the drawings.

Various examples will next be described to illustrate different example embodiments of the invention. The structures of these embodiments may be varied in many ways. It is intended to make reference to a schematic system presented in FIG. 1 in order to present a basic system in which example embodiments are described, and to then discuss various operations according to different example embodiments. This detailed description merely presents some example embodiments of the invention.

In an example embodiment, an image stabilizer of a camera device is used to produce special effects that have traditionally been produced by moving the entire camera or by digital editing. Before explaining the operation and new use of the image stabilizer, basic operations of some digital camera devices are next explained.

Figure 1:
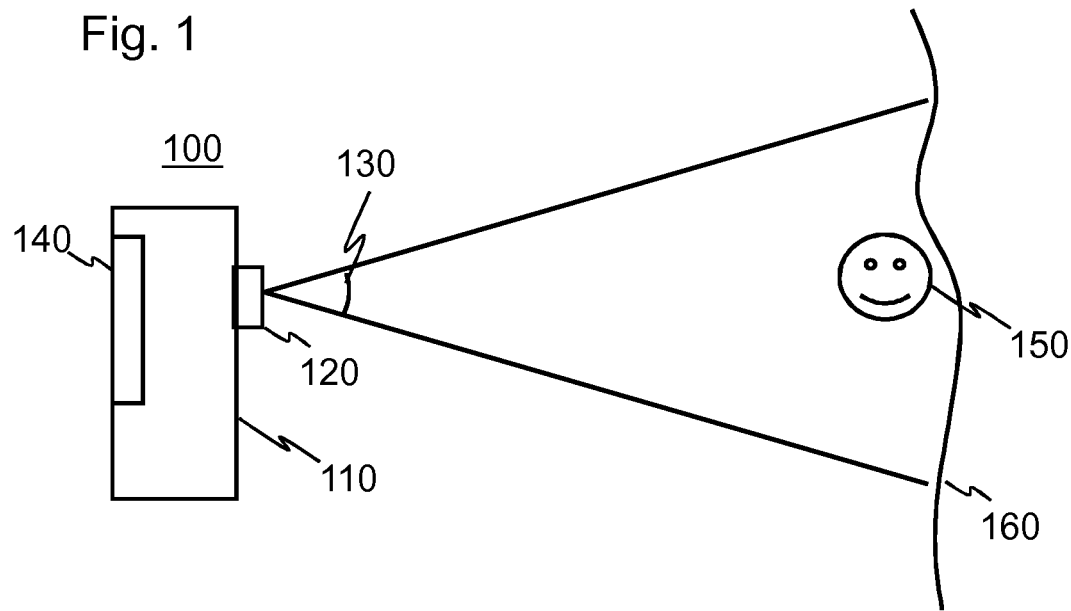
FIG. 1 shows a schematic system for use as a reference with which some example embodiments of the invention can be explained.

FIG. 1 shows a schematic system 100 for use as a reference with which some example embodiments of the invention can be explained. The system 100 comprises a device 110 such as a camera phone, gaming device, personal digital assistant, tablet computer or a digital camera having a camera unit 120 that is capable of capturing video images with a field of view 130. The device 110 further comprises a display 140. FIG. 1 also shows an image object 150 that is being imaged by the camera unit 120 and a background 160 such as a curtain behind the image object.

Figure 2:
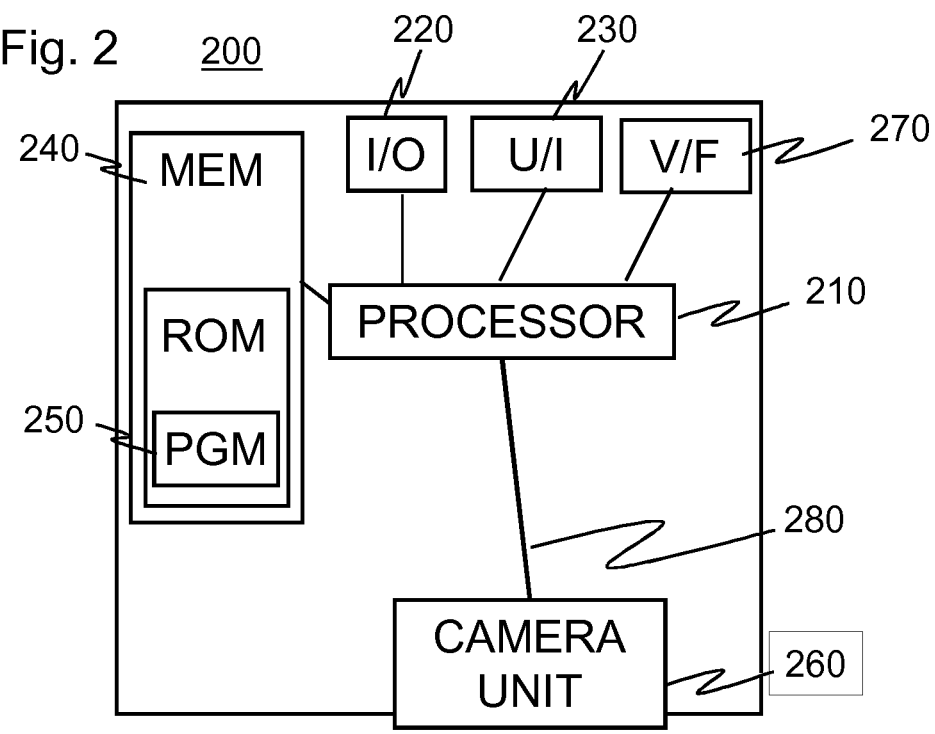
FIG. 2 shows a block diagram of an apparatus of an example embodiment of the invention.

FIG. 2 shows a block diagram of an apparatus 200 of an example embodiment of the invention. The apparatus 200 is suited for operating as the device 110. The apparatus 200 comprises a communication interface 220, a host processor 210 coupled to the communication interface module 220, and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded into and executed by the host processor 210. The software 250 may comprise one or more software modules and can be in the form of a computer program product that is software stored in a memory medium. The apparatus 200 further comprises a camera unit 260 and a viewfinder 270 each coupled to the host processor 210. The camera unit 260 and the processor 210 are connected via a camera interface 280.

Figure 3:
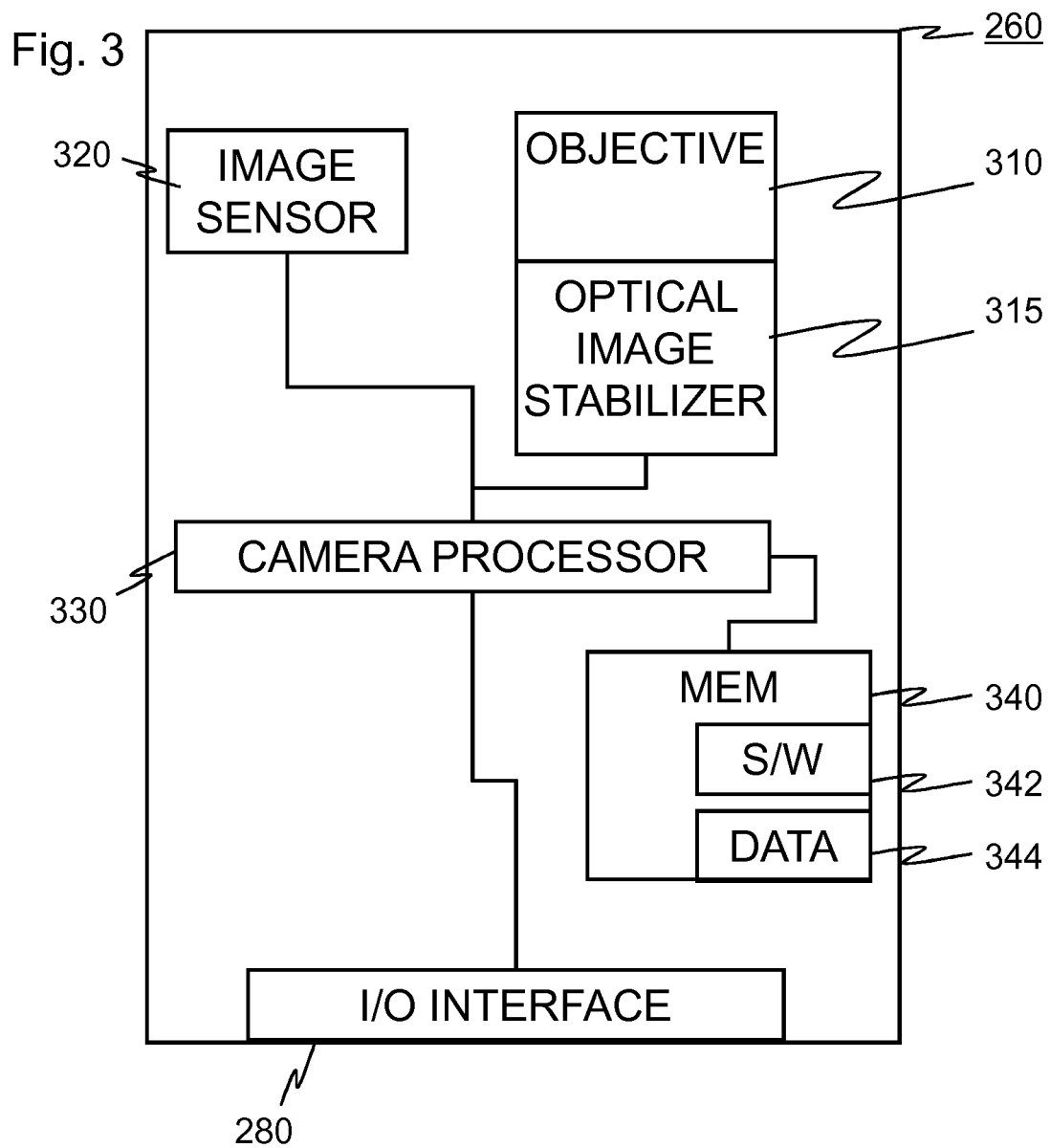
FIG. 3 shows a block diagram of a camera unit of an example embodiment of the invention.

Term host processor refers to a processor in the apparatus 200 in distinction of one or more processors in the camera unit 260, referred to as camera processor(s) 330 in FIG. 3. Depending on implementation, different example embodiments of the invention share processing of image information and control of the camera unit 260 differently between the camera unit and one or more processors outside the camera unit. Also, the processing is performed on the fly in one example embodiment and with buffering in another example embodiment. It is also possible that a given amount of images or image information can be processed on the fly and after than buffered operation mode is used as in one example embodiment.

It shall be understood that any coupling in this document refers to functional or operational coupling; there may be intervening components or circuitries in between coupled elements.

The communication interface module 220 is configured to provide local communications over one or more local links. The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

The host processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one host processor 210, but the apparatus 200 may comprise a plurality of host processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, an input of the processor 210 configured to receive information from the camera unit and an output of the processor 210 configured to provide information to the viewfinder. In one example embodiment, the apparatus refers to a device that receives image information from the image sensor via a first input and produces sub-images to a second input of an image processor, which image processor is any circuitry that makes use of the produced sub-images. For instance, the image processor may comprise the processor 210 and the device in question may comprise the camera processor 330 and the camera interface 280 shown in FIG. 3.

FIG. 3 shows a block diagram of a camera unit 260 of an example embodiment of the invention. The camera unit 260 comprises an objective 310, an optical image stabilizer 315, an image sensor 320, a camera processor 330, a memory 340 comprising data 344 and software 342 with which the camera processor 330 can manage operations of the camera unit 260. The camera processor 330 operates as an image processing circuitry of an example embodiment. An input/output or camera interface 280 is also provided to enable exchange of information between the camera unit 260 and the host processor 210. The image sensor 320 is, for instance, a CCD or CMOS unit. In case of a CMOS unit, the image sensor 320 can also contain built-in analog-to-digital implemented on common silicon chip with the image sensor 320. In an alternative example embodiment, a separate A/D conversion is provided between the image sensor 320 and the camera processor 330.

The camera processor 330 takes care in particular example embodiments of one or more of the following functions: pixel color interpolation; white balance correction; edge enhancement; anti-aliasing of images; vignetting correction; combining of subsequent images for high dynamic range imaging; bayer reconstruction filtering; chromatic aberration correction; dust effect compensation.

The data 344 comprises, for example, special effect instructions that define one or more desired motions to be made during capture of video image.

The optical image stabilizer 315 is configured to stabilize the image that is cast by the objective 310 on the image sensor 320 by performing rapid movements when necessary.

Figure 4:
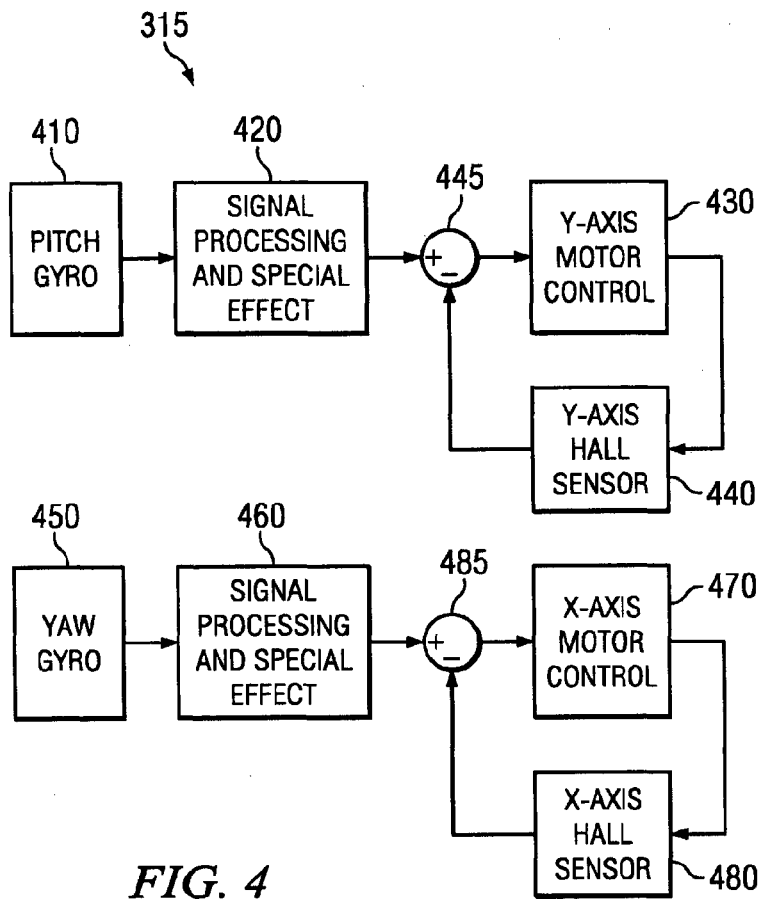
FIG. 4 shows main blocks of an optical image stabilizer according to an example embodiment of the present invention.

FIG. 4 shows main blocks of an optical image stabilizer 315 according to an example embodiment of the present invention.

The optical image stabilizer 415 comprises a pitch gyroscope detector, a pitch signal processing block 420 with a special effect functionality, a Y-axis actuator 430 such as motor control, a Y-axis sensor 440 such as a Hall effect sensor, and a feedback loop forming block 445 such as a summer configured to combine the output of the pitch signal processing block with the output of the Y-axis sensor 440 so as to form a feedback control loop for the adjustment of the optical Y-axis. These blocks in combination are configured to stabilize the image in Y-axis direction (pitch) with an ability to cause intentional Y-axis directional movements for causing desired special effects.

For X-axis direction operation, there is another branch with a yaw gyroscope detector 450, a yaw signal processing block 460 with a special effect functionality, an X-axis actuator 470 such as motor control, an X-axis sensor 480 such as a Hall effect sensor, and a feedback loop forming block 485 such as a summer configured to combine the output of the yaw signal processing block with the output of the X-axis sensor 440 so as to form a feedback control loop for the adjustment of the optical X-axis.

At this stage, it is noted that the optical image stabilizer 415, while drawn in connection with the objective 310 in FIG. 3, is configured in another example embodiment to move the image sensor 320.

The pitch and yaw signal processing blocks 420, 460 are in an example embodiment formed with a common processing element that also synchronizes the X- and Y-directional movements. If these blocks are separate, then one of the blocks or another block takes care of the synchronizing of the X- and Y-directional movements caused by the X- and Y-directional actuators 430, 470.

It is understood that there are various different implementations according to different example embodiments for the apparatus 200 as well as for the camera module 260. For instance, the apparatus 200 can be provided with an image accelerator configured to process information received from the interface 280 that otherwise would be performed by the host processor 210 or by the camera processor 330. Moreover, either or both of the host processor 210 and of the camera processor 330 can be implemented using one or more processors.

FIG. 4 illustrates use of an optical image stabilizer 410 for both stabilizing of the image produced on the image sensor 320 and for causing movement in the image produced on the image sensor 320 by the objective 310. It is also possible to make use of a digital image stabilizer instead of or in addition to an optical image stabilizer. The digital image stabilizer is implemented as a separate circuitry or function or as a combination with another circuitry or function.

Figure 5:
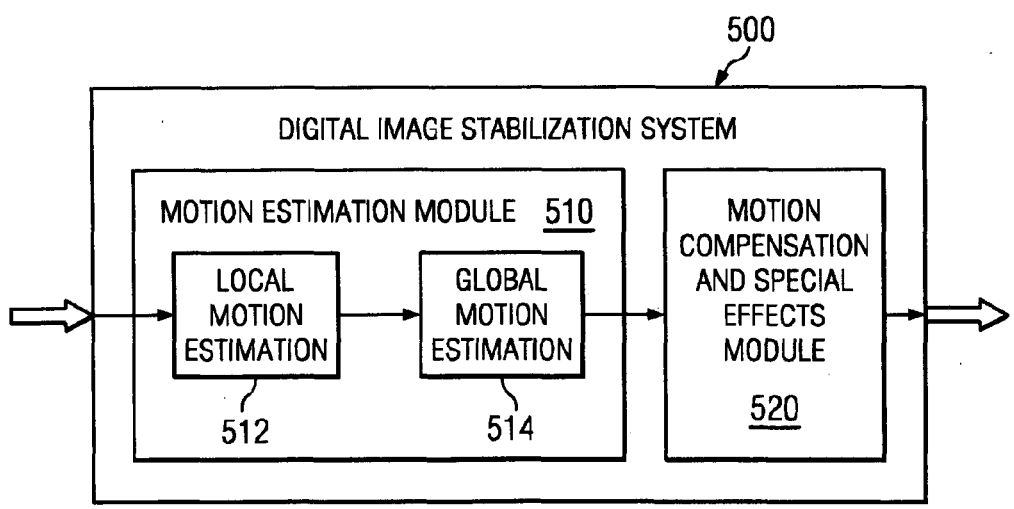
FIG. 5 shows a block diagram of a digital image stabilizer with an additional special effect functionality according to an example embodiment.

FIG. 5 shows a block diagram of a digital image stabilizer 500 with an additional special effect functionality according to an example embodiment.

The digital image stabilizer 500 comprises a motion estimation module 510 and an enhanced motion compensation module or motion effect module 520. The motion estimation module comprises a local motion estimation block 512 and a global motion estimation block 514 configured to estimate motion in different image objects and in the image as a whole, respectively. The motion effect module 520 is configured to determine the direction and extent to which the image frames captured by the image sensor 320 should be moved to stabilize the image unless a special effect is being produced. If a special effect is being produced, a combined impact of motion compensation and special effect is determined and the direction and extent of movement of the image frames is calculated accordingly.

Figure 6:
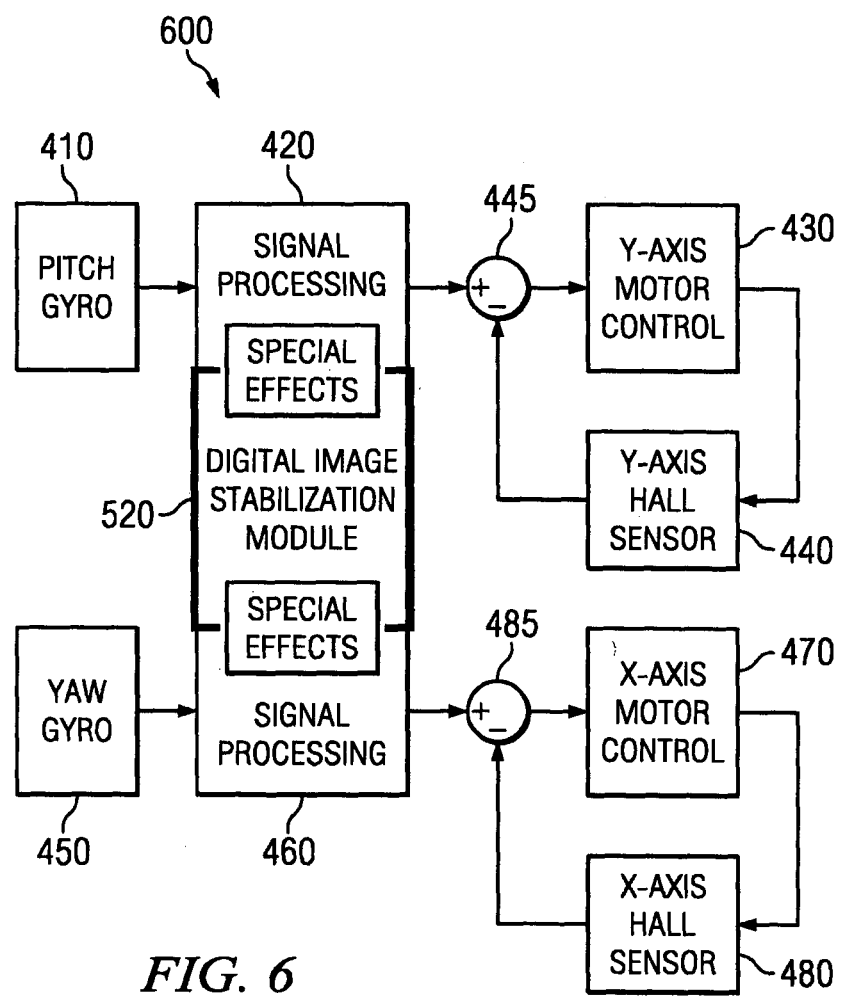
FIG. 6 shows a block diagram of a combined digital and optical image stabilizer with special effect capability according to an example embodiment.

FIG. 6 shows a block diagram of a combined digital and optical image stabilizer 600 with special effect capability according to an example embodiment. The combined image stabilizer 600 makes use of both digital and optical image stabilization. For example, the optical image stabilizer 315 in this embodiment can be used to perform course image stabilization and the digital image stabilization to perform fine tuning. On the other hand and especially for performing special effects, the optical and digital image movement capabilities can be combined to their maximum extent where necessary to make large shifts in image location.

The image stabilization can additionally or alternatively be configured to make use combining short exposure time images and aligning these on forming an image with required total exposure time for reducing effects of motion in the images.

Figure 7:
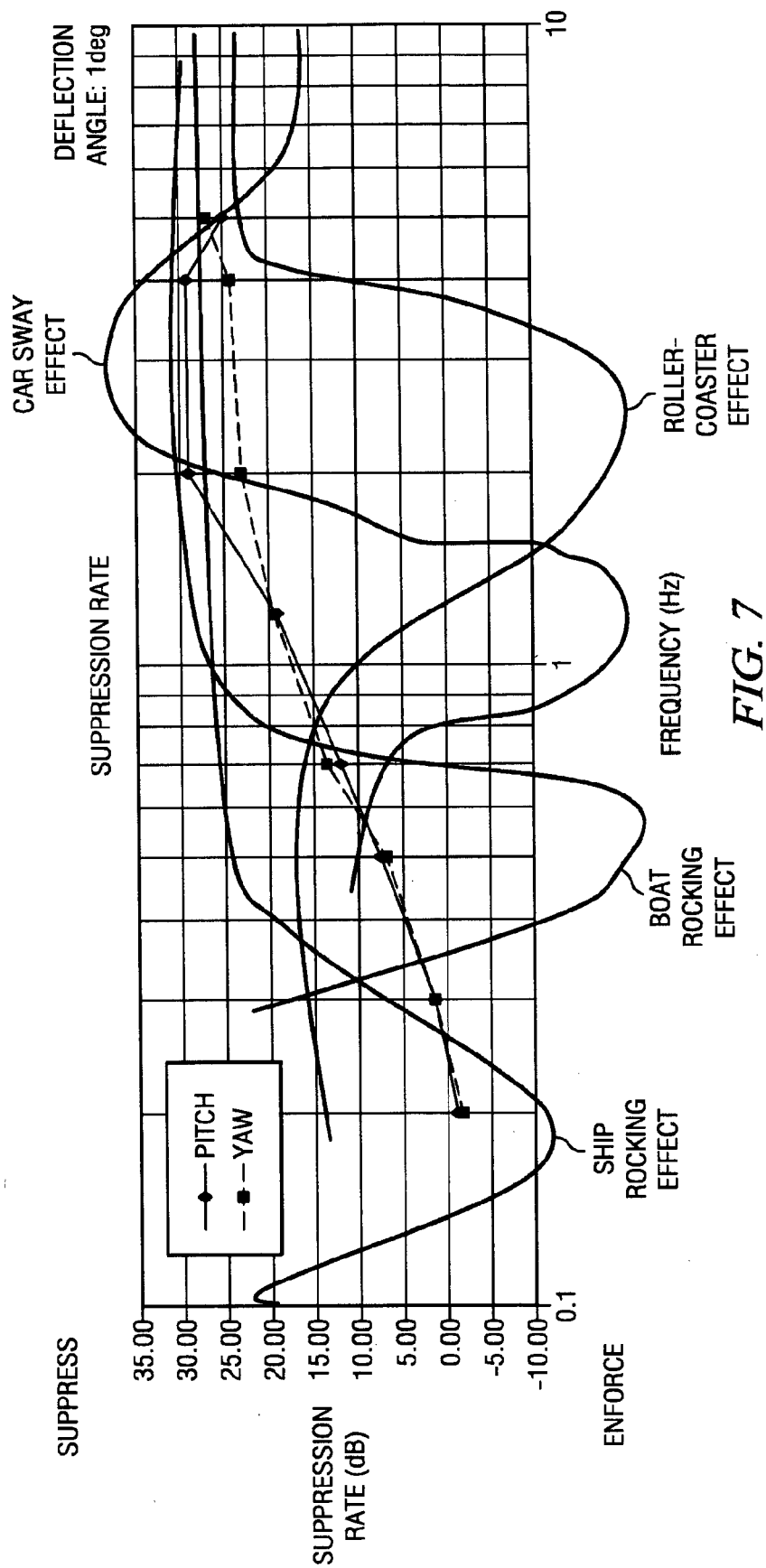
FIG. 7 shows an illustration of the operation of an image stabilization function when various special effects are being produced.

FIG. 7 shows an illustration of the operation of an image stabilization function when various special effects are being produced. FIG. 7 shows the suppression rates for X- and Y-directional movements (pitch and yaw, respectively) for different frequencies of movements that correspond to special effects of: ship rocking, boat rocking, a vehicle such as a car or motorbike swaying in accelerating, decelerating or sharp turning, and roller-coaster effect.

While many special effects are produced in different example embodiments by moving image frames in X- and Y-directions (horizontally and vertically), one further example embodiment is further mentioning. Instead or in addition to lateral movements or movements in X- and Y-directions, image frames can be at least virtually moved in depth i.e. Z-direction. The Z-directional movement can be performed e.g. by changing scaling of image frames e.g. by digital or optical zooming in or out.

FIG. 8 shows a flow chart of a process according to an example embodiment of the invention. The process can be performed by an apparatus that controls the image stabilizer of a camera.

First, the movement of current image frame is detected in comparison to one or more previous frames, 810. It is checked 820 whether a special effect mode is on. If yes, the desired movement of the current image frame is determined 830 taking into account the special effect that is being applied and the stage in which the special effect currently is. The required movement of the current image is determined 840 based on the desired movement and the detected movement of the current frame. The current image frame is then moved 850 by the required movement, if possible (if there is sufficient margin of not needed image data received from the image sensor 320). The required movement for the next image frame is estimated 860 taking into account the detected movement of the current image frame. After start and in one example embodiment before the starting of application of the special effect, the progress of the special effect is also taken into account such that the image stabilization function is controlled 870 to anticipate the movement of the camera and the progress of the special effect. Hence, during operation, the image stabilizer can be controlled to remove effects of e.g. handshake while also applying a special effect into video image that is being captured by the controlled camera unit.

For starting the application of a special effect, there are various example embodiments provided, such as:

i. detecting intentional movement of the camera when in a special effect program as an indication of the start of the special effect. The intentional movement is, for instance, corresponding to a first movement in the special effect in question. After the first intentional movement, returning the camera close enough to its preceding orientation is required in one example embodiment as an indication of the desire to start the special effect. Such further requirement may also help the image stabilization to produce remaining other movements in possibly opposing direction.

ii. detecting a command issued by using a button or other user control provided by the camera or in connection with the camera.

iii. detecting a voice command issued by a user.

iv. detecting a flash of light.

v. detecting a flash of light with given characteristics such as duration, color or spectrum.

For instance, a flash gun can be used to initiate a special effect. This example embodiment may provide a further effect that the flash also clearly informs every people in the video image about the start of the special effect so that they can synchronously start acting as if being involved in an act the special effect is modeling.

The detecting of an event that starts the application of the special effect can be performed by any suitable circuitry or function. For instance, term user command input can be used to refer to such a circuitry or function that determines the intentional movement of the camera, issuing of a command using a button or other user control, detecting a voice command or a flash of light, etc. The user command input is implemented in different example embodiments in different ways using, for instance, the user interface 230, host processor 210 or camera processor 230.

It will be understood that each operation of the flowcharts, and/or combinations of operations in the flowcharts can be implemented by various means. Means for implementing the operations of the flowcharts, combinations of the operations in the flowchart, or other functionality of the example embodiments described herein may comprise software, hardware, application logic or a combination of software, hardware and application logic.

Without in any way limiting the scope, interpretation, or application of the appended claims, a technical effect of one or more of the example embodiments disclosed herein is that a special effect can be made during capture of video footage using image stabilization function of the camera. Another technical effect of one or more of the example embodiments disclosed herein is that the special effects can be produced without necessarily using complex and stable cradles as handshake can be compensated with the image stabilization function while the same image stabilization function is producing the special effects. Another technical effect of one or more of the example embodiments disclosed herein is that the producing of special effects during capture of video footage can remove the need for video editing as post-processing. The resolution of video image is tends to increase as camera and display technologies develop which also drastically increases computational burden of post-processing. Real-time producing of special effects can help to avoid such computationally intensive and often slow and cumbersome operations.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the aforedescribed functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An apparatus comprising:
an input configured to receive successive video image frames from an image sensor;
a memory configured to store motion effect data, where the motion effect data defines a special effect; and
a special effect controller configured to produce instructions to an image stabilizer, based at least partially upon the motion effect data, such that a following one or more video image frames will be moved in at least one of X- and Y-directions to apply the special effect to the following one or more video image frames, where a movement of the following one or more video image frames is determined based on a desired movement for producing the special effect in the following one or more video image frames and a detected movement of a current one of the video frames.

2. The apparatus of claim 1, wherein the image sensor has a given view that the image sensor is configured to image, the image stabilizer comprising an optical image stabilizer configured to stabilize the view of the image sensor.

3. The apparatus of claim 2, wherein the optical image stabilizer comprises a gyroscopic acceleration sensor.

4. The apparatus of claim 2, wherein the optical image stabilizer comprises an actuator for adjusting alignment of at least one lens of an objective that forms the image on the image sensor.

5. The apparatus of claim 2, wherein the optical image stabilizer comprises an actuator configured to adjust alignment of the image sensor.

6. The apparatus of claim 4, further comprising a feedback sensor configured to detect movements caused by the actuator.

7. The apparatus of claim 6, wherein feedback sensor is configured to form a feedback loop for the actuator and the special effect controller is further configured to adjust the feedback loop based on the instructions.

8. The apparatus of claim 2, wherein the special effect controller is further configured to:
receive measurement data from the optical image stabilizer indicative of changes in the view of the image sensor;

determine desired view of the image sensor; and adjust operation of an actuator unit of the optical image stabilizer based on the desired view.

9. The apparatus of claim 1, wherein the image stabilizer further comprises a digital image stabilizer.

10. The apparatus of claim 1, further comprising a user command input configured to determine a start command and to responsively start the producing instructions to the image stabilizer.

11. The apparatus of claim 10, wherein the user command input is configured to determine a start command by detecting an intentional movement of a camera that comprises the image sensor.

12. The apparatus of claim 10, wherein the user command input is configured to determine a start command by detecting a command issued by using a button or other user control.

13. The apparatus of claim 10, wherein the user command input is configured to determine a start command by detecting a voice command issued by a user.

14. The apparatus of claim 10, wherein the user command input is configured to determine a start command by detecting a flash of light.

15. The apparatus of claim 10, wherein the user command input is configured to determine a start command by detecting a flash of light with given characteristics.

16. A method comprising:

receiving successive video image frames from an image sensor;

storing motion effect data in a non-transitory memory, where the motion effect data defines a special effect; and producing instructions to an image stabilizer, based at least partially upon the motion effect data stored in the memory, such that a following one or more video image frames will be moved in at least one of X- and Y-directions, to apply the special effect to the following one or more video image frames, where a movement of the following one or more video image frames is determined by a processor based on a desired movement for producing the special effect in the following one or more video image frames and a detected movement of a current one of the video frames.

17. The method of claim 16, wherein the image sensor has a given view that the image sensor is configured to image; and performing optical image stabilizing by the image stabilizer to stabilize the view of the image sensor.

18. The method of claim 17, wherein the performing of the optical image stabilizing is based on using a gyroscopic acceleration sensor.

19. The method of claim 16, wherein the optical image stabilizing comprises adjusting alignment of at least one lens of an objective that forms the image on the image sensor.

20. The method of claim 17, wherein the optical image stabilizing comprises adjusting alignment of the image sensor.

21. The method of claim 19, further comprising detecting changes in the view of the image sensor caused by the adjusting of the alignment.

22. The method of claim 21, further comprising forming a feedback loop for the adjusting of the alignment and the method further comprises adjusting the feedback loop based on the instructions.

23. The method of claim 17, further comprising:

receiving measurement data from the optical image stabilizing indicative of changes in the view of the image sensor;

determining desired view of the image sensor; and adjusting operation of the optical image stabilizing based on the desired view.

24. The method of claim 16, wherein the image stabilizer further comprises a digital image stabilizer.

25. The method of claim 16, further comprising determining a start command and responsively starting the producing of instructions to the image stabilizer.

26. The method of claim 25, wherein the start command is determined by detecting an intentional movement of a camera that comprises the image sensor.

27. The method of claim 25, wherein the start command is determined by detecting a command issued by using a button or other user control.

28. The method of claim 25, wherein the start command is determined by detecting a voice command issued by a user.

29. The method of claim 25, wherein the start command is determined by detecting a flash of light.

30. The method of claim 25, wherein the start command is determined by detecting a flash of light with given characteristics.

31. A computer program product comprising a non-transitory computer-readable storage medium bearing computer program code embodied therein for use with a computer, the computer program code comprising code for performing the method according to claim 16.

* * * * *